US008872392B1

(12) United States Patent
Gurunathan et al.

(10) Patent No.: US 8,872,392 B1
(45) Date of Patent: Oct. 28, 2014

(54) FUEL CELL CONTROL SYSTEM

(75) Inventors: Ranganathan Gurunathan, Chennai (IN); Ramesh Srinivasan, Chennai (IN); Saravana Kumar, Chennai (IN); Vishal Anand, Chennai (IN)

(73) Assignee: Bloom Energy Corporation, Sunnyvale, CA (US)

( * ) Notice: Subject to any disclaimer, the term of this patent is extended or adjusted under 35 U.S.C. 154(b) by 1394 days.

(21) Appl. No.: 12/458,172

(22) Filed: Jul. 2, 2009

Related U.S. Application Data

(60) Provisional application No. 61/129,620, filed on Jul. 8, 2008.

(51) Int. Cl.
*G05F 3/06* (2006.01)

(52) U.S. Cl.
USPC .......... 307/151

(58) Field of Classification Search
USPC ........ 307/82, 151; 363/17, 65, 71, 13, 16, 18, 363/40, 131; 429/13, 23
See application file for complete search history.

(56) References Cited

U.S. PATENT DOCUMENTS 5,075,565 A * 12/1991 Severinsky et al. ............ 307/66
5,120,986 A * 6/1992 Shekhawat .................... 327/129
6,487,096 B1 11/2002 Gilbreth et al.
6,700,802 B2 3/2004 Ulinski et al.
6,700,804 B1 * 3/2004 Reichard ........................ 363/51
6,812,587 B2 11/2004 Gilbreth et al.
7,974,106 B2 * 7/2011 Gurunathan et al. ........... 363/17
2004/0155526 A1 * 8/2004 Naden et al. .................... 307/43
2004/0170038 A1 * 9/2004 Ichinose et al. ................. 363/95
2008/0180164 A1 * 7/2008 Pelly ............................ 327/552
2008/0278968 A1 11/2008 Srinivasan et al.
2009/0273240 A1 11/2009 Gurunathan et al.

* cited by examiner

*Primary Examiner* — Daniel Cavallari
(74) *Attorney, Agent, or Firm* — The Marbury Law Group PLLC

(57) ABSTRACT

A method includes receiving a direct current (DC) signal at an inverter control system from a bus. The inverter control system includes an inverter and an inverter controller. The received DC signal is compared to a reference value. Based at least in part on the comparison, the inverter controller determines whether to adjust a magnitude of the DC signal received through the bus. The DC signal is converted to an alternating current (AC) signal with the inverter, and the AC signal is provided to a load.

10 Claims, 3 Drawing Sheets

FUEL CELL CONTROL SYSTEM

CROSS REFERENCE TO RELATED APPLICATIONS

The present application claims priority to U.S. Provisional Patent Application No. 61/129,620, filed on Jul. 8, 2008, the entire disclosure of which is incorporated herein by reference.

FIELD

The subject of the disclosure relates generally to a fuel cell system with independent power control. More specifically, the disclosure relates to a system and method for individually controlling fuel cell systems and the amount of power provided to one or more loads in electrical communication with the fuel cell systems.

BACKGROUND

Fuel cell systems can be used to provide electrical power to external loads such as buildings, appliances, lights, tools, air conditioners, heating units, factory equipment and machinery, power storage units, computers, security systems, electric grids, etc. In addition to providing power to external loads, the electricity produced by a fuel cell system can also be used internally by the fuel cell system. For example, the electricity produced by the fuel cell system can be used to maintain fuel cell system variables such as temperature, fuel flow rate, pressure, etc. Electricity produced by the fuel cell system can also be used to power auxiliary devices, control units, startup devices, monitoring devices, balance of plant (BOP) devices, etc. utilized by the fuel cell system.

SUMMARY

An exemplary method is provided. The method includes receiving a direct current (DC) signal at an inverter control system from a bus. The inverter control system includes an inverter and an inverter controller. The received DC signal is compared to a reference value. Based at least in part on the comparison, the inverter controller determines whether to adjust a magnitude of the DC signal received through the bus. The DC signal is converted to an alternating current (AC) signal with the inverter, and the AC signal is provided to a load.

An exemplary method for controlling a fuel cell arrangement includes receiving a direct current (DC) signal at a DC/DC converter system from a fuel cell system, where the DC/DC converter system includes a DC/DC converter. The received DC signal or an output signal from the DC/DC converter system is compared to a variable. A determination is made regarding whether a value, a threshold, or a setpoint for the variable is exceeded based at least in part on the comparison. A magnitude of the received DC signal or of the output signal is adjusted if the value, the threshold, or the setpoint is exceeded.

A system is also provided. The system includes a monitoring component, an inverter controller, and an inverter. The monitoring component is configured to compare a direct current (DC) signal to a variable, The inverter controller is configured to generate a control signal based at least in part on the comparison. The inverter is configured to receive the control signal from the inverter controller, increase or decrease a magnitude of the DC signal based at least in part on the control signal, convert the DC signal to an alternating current (AC) signal, and provide the AC signal to a load.

Another exemplary system for controlling a fuel cell arrangement includes a monitoring component, a DC/DC controller, and a DC/DC converter. The monitoring component is configured to receive a direct current signal from a fuel cell system or from the DC/DC converter and compare the DC signal to a variable, where the variable corresponds to an operating characteristic of the fuel cell system, a threshold, or a setpoint. The DC/DC controller is configured to generate a control signal based at least in part on the comparison. The DC/DC converter is configured to receive the control signal and adjust a magnitude of the DC signal based on the control signal.

Another exemplary method includes receiving a direct current (DC) signal at a DC/DC converter system from a fuel cell system, where the DC/DC converter system includes a DC/DC converter. The received DC signal or an output signal from the DC/DC converter is compared to a first variable. A determination is made regarding whether a value, a threshold, or a setpoint for the first variable is exceeded based at least in part on the comparison. A magnitude of the received DC signal or of the output signal is adjusted if the value, the threshold, or the setpoint is exceeded. An adjusted DC signal is received at an inverter control system from a bus, where the inverter control system includes an inverter and an inverter controller. The adjusted DC signal is compared to a second variable. The inverter controller is used to determine, based at least in part on the comparison to the second variable, whether to adjust a magnitude of the adjusted DC signal received through the bus. The adjusted DC signal is converted to an alternating current (AC) signal with the inverter. The AC signal is provided to a load.

Other principal features and advantages will become apparent to those skilled in the art upon review of the following drawings, the detailed description, and the appended claims.

BRIEF DESCRIPTION OF THE DRAWINGS

Exemplary embodiments will hereafter be described with reference to the accompanying drawings.

DETAILED DESCRIPTION

In a traditional fuel cell arrangement, a plurality of fuel cell systems may be connected in parallel or series to generate a desired amount of power. The plurality of fuel cell systems are generally controlled as a single power source having a single output. However, each of the plurality of fuel cell systems may vary slightly in operation, and may produce a different amount of power at any given time. The inventors have perceived that controlling a plurality of fuel cell systems as a single unit may decrease overall system efficiency and may result in fuel cell degradation. As such, the inventors have perceived a need for a fuel cell arrangement in which fuel cell systems can be individually monitored and controlled to improve system performance and life.

Traditional fuel cell arrangements may also include an inverter to convert a direct current (DC) generated by the fuel cell systems into an alternating current (AC) for delivery to one or more AC loads. The inverter may automatically provide all of the received AC power to the one or more loads regardless of the state of the fuel cell arrangement. The inventors have perceived that automatically distributing all available power to the load(s) can decrease efficiency and increase deterioration of the fuel cell arrangement. As such, the inventors have perceived a need for a fuel cell arrangement with an inverter that is configured to intelligently distribute generated power among one or more loads based on the monitoring of one or more internal processes.

Figure 1:
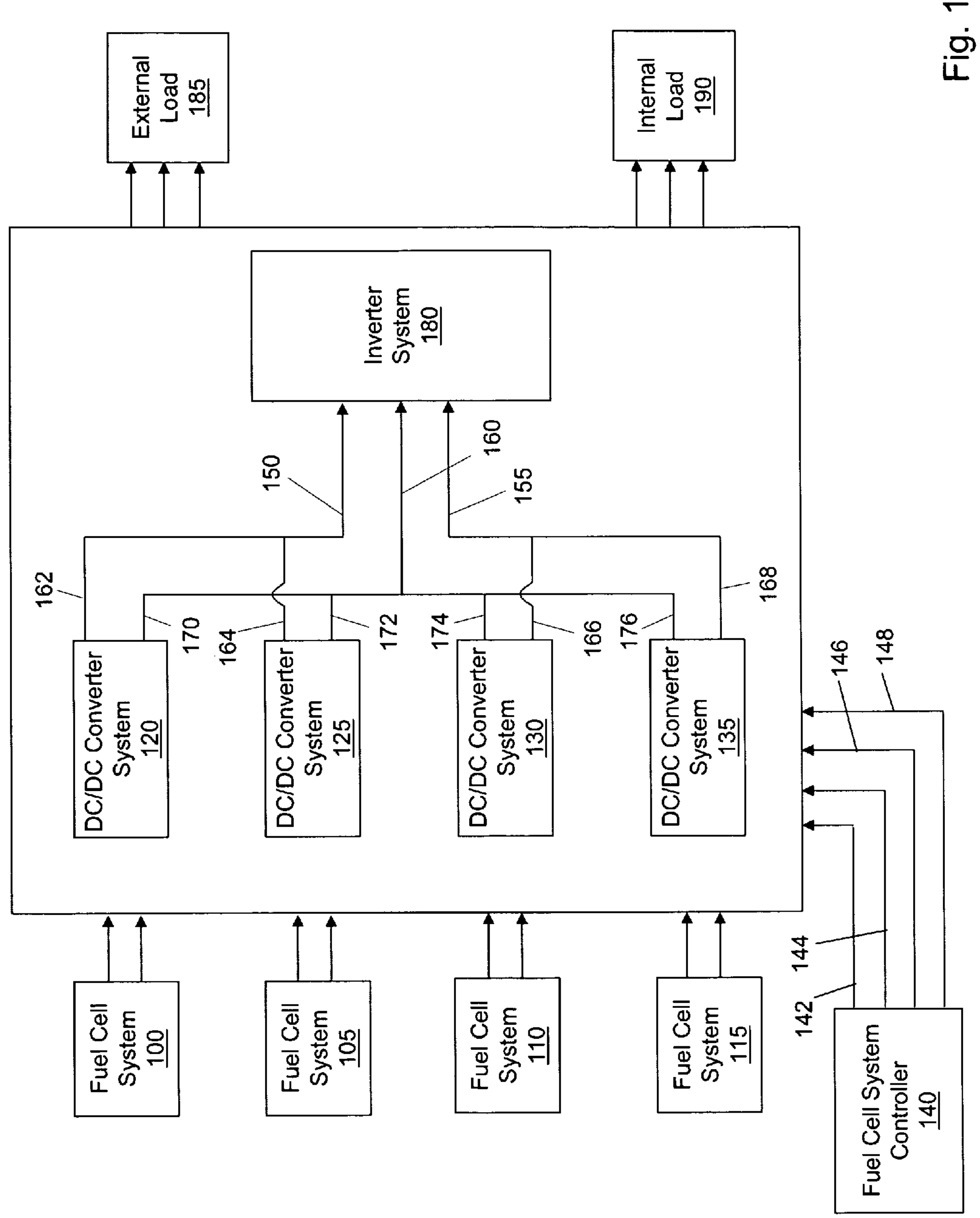
FIG. 1 is a block diagram illustrating a fuel cell arrangement with power control in accordance with an exemplary embodiment.

FIG. 1 is a block diagram illustrating a fuel cell arrangement with power control in accordance with an exemplary embodiment. The fuel cell arrangement includes a first fuel cell system 100, a second fuel cell system 105, a third fuel cell system 110, and a fourth fuel cell system 115. Fuel cell systems 100, 105, 110, and 115 can produce a direct current (DC) signal as known to those of skill in the art. In alternative embodiments, fewer or additional fuel cell systems can be included in the system. In an exemplary embodiment, a fuel cell system can include one or more fuel cell columns, each of which may contain one or more fuel cell stacks, such as solid oxide fuel cell stacks. A fuel cell stack can refer to a plurality of individual fuel cells which are electrically connected in series. Alternatively, a fuel cell system can refer to a single fuel cell stack. The number of individual fuel cells which make up a given fuel cell system can depend on the amount of electrical power which the given fuel cell system is intended to generate.

In alternative embodiments, fuel cell systems 100, 105, 110, and 115 can include any other configuration, arrangement, and/or number of individual fuel cells, and may be arranged in a modular configuration, where the power supply system is comprised of separate fuel cell modules or systems and associated power conditioning modules and fuel preprocessing modules. An exemplary fuel cell system is described in U.S. patent application Ser. No. 11/797,707 (filed May 7, 2007 and entitled Ripple Cancellation), the disclosure of which is incorporated herein by reference in its entirety.

The fuel cell arrangement also includes a DC/DC converter system 120, a DC/DC converter system 125, a DC/DC converter system 130, and a DC/DC converter system 135. Fuel cell system 100 can be in electrical communication with DC/DC converter system 120, fuel cell system 105 can be in electrical communication with DC/DC converter system 125, fuel cell system 110 can be in electrical communication with DC/DC converter system 130, and fuel cell system 115 can be in electrical communication with DC/DC converter system 135. As used herein, electrical communication can refer to any direct or indirect electrical connection. In an exemplary embodiment, each of DC/DC converter systems 120, 125, 130, and 135 can include a DC/DC converter, a DC/DC controller, and one or more monitoring components. The monitoring components, which can be implemented in hardware and/or software, can be used to monitor one or more fuel cell system variables. An exemplary monitoring component can be a comparator, and exemplary fuel cell system variables can include output current, output voltage, output power, etc.

The DC/DC controller can be used to control the power drawn by the DC/DC converter from the fuel cell system. The DC/DC controller can control the DC/DC converter based at least in part on the monitored system variables. As an example, a monitoring component of DC/DC converter system 130 may indicate that a direct current produced by fuel cell system 110 has exceeded a current threshold. In response to the exceeded threshold, a DC/DC controller of DC/DC converter system 130 can cause a DC/DC converter of DC/DC converter system 130 to draw less current from fuel cell system 110. Similarly, a second monitoring component of DC/DC converter system 130 may be used to monitor and control an output of the DC/DC converter associated with DC/DC converter system 130. An exemplary DC/DC converter system is described in more detail with reference to FIG. 2. The DC/DC converters can also be used to increase (i.e., boost) the voltage of the DC signals received from the fuel cell systems. For example, the DC/DC converter of DC/DC converter system 120 can be used to increase the voltage of the DC signal received from fuel cell system 100, the DC/DC converter of DC/DC converter system 125 can be used to increase the voltage of the DC signal received from fuel cell system 105, and so on. In an alternative embodiment, the DC/DC converters of DC/DC converter systems 120, 125, 130, and 135 may be used to decrease the voltage of the DC signals produced by fuel cell systems 100, 105, 110, and 115. In another alternative embodiment, DC/DC converters may not be used.

The fuel cell arrangement also includes a fuel cell system controller 140. In an exemplary embodiment, fuel cell system controller 140 can be used to determine individual reference values for each of fuel cell systems 100, 105, 110, and 115. The reference values can be current values, voltage values, power values, etc. which represent desired operating thresholds of the respective fuel cell systems. As illustrated in FIG. 1, fuel cell system controller 140 can determine a first reference value 142 corresponding to fuel cell system 100, a second reference value 144 corresponding to fuel cell system 105, a third reference value 146 corresponding to fuel cell system 110, and a fourth reference value 148 corresponding to fuel cell system 115. Reference values 142, 144, 146, and 148 can be determined based on performance characteristics of fuel cell systems 100, 105, 110, and 115, respectively. As such, each fuel cell system may have a different reference value.

The monitoring components in DC/DC converter systems 120, 125, 130, and 135 can compare the reference values from fuel cell system controller 140 to corresponding measured values from fuel cell systems 100, 105, 110, and 115. The DC/DC controllers can be used to adjust the amount of current, voltage, power, etc. produced by fuel cell systems 100, 105, 110, and 115 based on the comparisons. As an example, fuel cell system controller 140 can determine a reference current for fuel cell system 105 based on performance characteristics of fuel cell system 105. A comparator of DC/DC converter system 125 can be used to compare the reference current to a measured current from the output of fuel cell system 105. If the measured current is greater than the reference current, a DC/DC controller of DC/DC converter system 125 can cause a DC/DC converter of DC/DC converter system 125 to draw less current from fuel cell system 105. If the measured current is less than the reference current, the DC/DC controller can cause the DC/DC converter to draw more current from fuel cell system 105. Fuel cell systems 100, 110, and 115 can be similarly controlled such that individual fuel cell system control is achieved.

As illustrated in FIG. 1, positive and negative outputs of the DC/DC converter systems 120, 125, 130, and 135 are combined to form a spit bus. The split bus includes a positive bus 150, a negative bus 155, and a neutral bus 160. Positive bus 150 is formed with a positive output 162 from DC/DC converter system 120 and a positive output 164 from DC/DC converter system 125. Negative bus 155 is formed with a negative output 166 from DC/DC converter system 130 and a negative output 168 from DC/DC converter system 135. Neutral bus 160 is formed with a negative output 170 from DC/DC converter system 120, a negative output 172 from DC/DC converter system 125, a positive output 174 from DC/DC converter system 130, and a positive output 176 from DC/DC converter system 135 (such that the positive and negative outputs combine to form a neutral output for neutral bus 160). In alternative embodiments, the split bus may be formed by any other combinations of the outputs of DC/DC converter systems 120, 125, 130, and 135. In one embodiment, the split bus configuration described in U.S. application Ser. No. 11/797,707, filed on May 7, 2007 and incorporated herein by reference in its entirety may be used. In another alternative embodiment, a split bus configuration may not be used.

Positive bus 150, negative bus 155, and neutral bus 160 are in electrical communication with an inverter system 180. Inverter system 180 can include an inverter, an inverter controller, and one or more monitoring components. The inverter of inverter system 180 can be any electrical device configured to receive a direct current and convert the received direct current into an alternating current for provision to an external load 185 and an internal load 190. External load 185 and internal load 190 can be in electrical communication with the inverter. In alternative embodiments, any number of internal and/or external loads may be provided with an AC signal from the inverter. The AC signal from the inverter to the loads can be a three-phase AC signal. Alternatively, any other AC signal may be used. External load 185 can be an electrical grid to which electrical power is being provided by the fuel cell arrangement. Alternatively, external load 185 can be a building, an appliance, an air conditioner, a heating unit, a computer, a security system, etc. Internal load 190 can be a power auxiliary device, a control unit, a startup device, a monitoring device, a balance of plant (BOP) device, etc.

The monitoring components of inverter system 180, which can be implemented in hardware and/or software, can be used to monitor one or more internal variables. An exemplary monitoring component can be a comparator, and exemplary internal variables can include a split bus current, a positive split bus voltage, a negative split bus voltage, etc. The internal variables can also include load thresholds. The inverter controller of inverter system 180 can be used to control the amount of power drawn from the split bus based on the monitored variables. The inverter controller can also be used to control the distribution of power between external load 185 and internal load 190.

As an example, a monitoring component of inverter system 180 can monitor a voltage on positive bus 150 of the split bus. If the voltage on positive bus 150 drops below a predetermined threshold, the inverter controller of inverter system 180 can increase the power drawn from the split bus. If the voltage on positive bus 150 exceeds the predetermined threshold, the inverter controller can decrease the power drawn from the split bus. As such, the inverter controller can be used to maintain the split bus at a desired voltage, current, etc. The inverter controller can also distribute power received from the split bus. In one embodiment, the inverter controller can provide sufficient power to internal load 190. The inverter controller can provide all excess power to external load 185. An exemplary inverter system is described in more detail with reference to FIG. 3.

Figure 2:
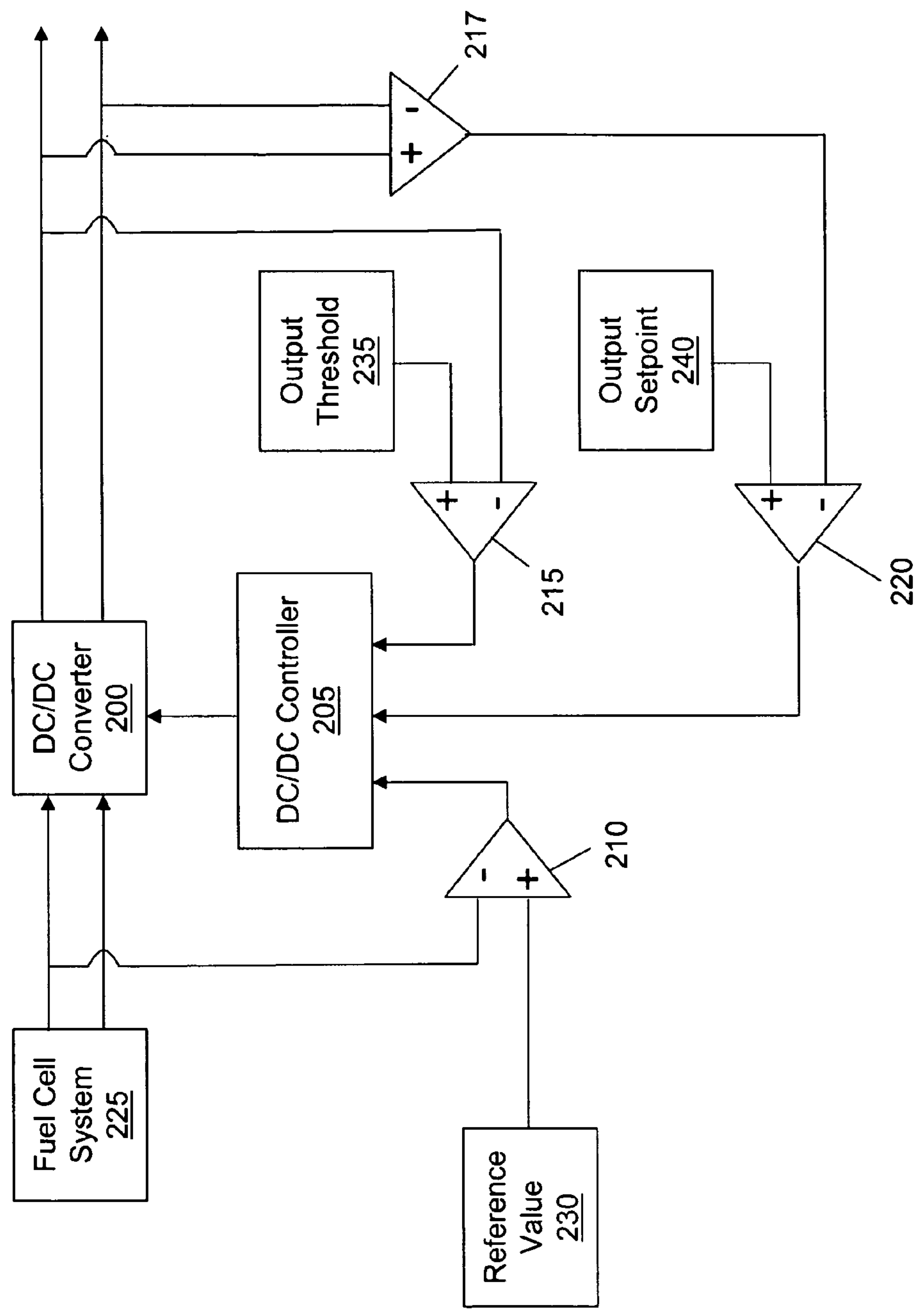
FIG. 2 is a block diagram illustrating a DC/DC converter system in accordance with an exemplary embodiment.

FIG. 2 is a block diagram illustrating a DC/DC converter system in accordance with an exemplary embodiment. The DC/DC converter system includes a DC/DC converter 200, a DC/DC controller 205, a comparator 210, a comparator 215, a comparator 217, and a comparator 220. In alternative embodiments, DC/DC converter system may include fewer, additional, and/or different components. The DC/DC converter system can be used to control the amount of power drawn from a fuel cell system 225. Fuel cell system 225 can be any of fuel cell systems 100, 105, 110, or 115 described with reference to FIG. 1. DC/DC controller 205 can receive inputs from comparator 210, comparator 215, and comparator 220. Based on the inputs, DC/DC controller 205 can provide a control signal to DC/DC converter 200. DC/DC converter 200 can draw power from fuel cell system 225 based on the control signal. In an exemplary embodiment, the output of DC/DC converter 200 can be determined at least in part by the load(s) being provided with power through an inverter in electrical communication with DC/DC converter 200. As such, the inverter may treat DC/DC converter 200 as a current source.

Comparators 210, 215, 217, and 220 can be implemented in hardware and/or software, and can be any type of comparators known to those of skill in the art. Comparator 210 is used to compare an output of fuel cell system 225 to a reference value 230. Reference value 230 can be an output voltage of fuel cell system 225, an output current of fuel cell system 225, and/or any other operating characteristic of fuel cell system 225. Reference value 230 can be determined and provided by a fuel cell system controller such as fuel cell system controller 140 described with reference to FIG. 1. The fuel cell system controller can determine reference value 230 based on one or more performance characteristics of fuel cell system 225. Performance characteristics can include an internal temperature of fuel cell system 225, an external temperature of the environment, a fuel flow rate of fuel cell system 225, one or more load demands, a measured voltage of fuel cell system 225, etc. Reference value 230 can be any measured, stored and/or calculated value. Based on the comparison, comparator 210 can provide an output to DC/DC controller 205.

Comparator 215 is used to compare an output of DC/DC converter 200 to an output threshold 235. In one embodiment, output threshold 235 can be a maximum output current for DC/DC converter 200. The maximum output current can be based on a desired operating condition, the current capacity of DC/DC converter 200, the current capacity of fuel cell system 225, or any other factor. Alternatively, output threshold 235 can be any other variable associated with the output of DC/DC converter 200. Output threshold 235 can be a stored value, a measured value, and/or a calculated value based on any parameters. Based on the comparison, comparator 215 can provide an output to DC/DC controller 205. Comparator 220 is used to compare an output of comparator 217 to an output setpoint 240. The output of comparator 217 is based on a comparison of the outputs from DC/DC converter 200. As such, comparator 217 can generate an output based on an output voltage, output current, output power, etc. of DC/DC converter 200. In an exemplary embodiment, output setpoint 240 can be a desired voltage to be output by DC/DC converter 200. In another exemplary embodiment, output setpoint 240 can be 390 Volts. The desired voltage can be based on a desired operating condition, a number of loads in electrical communication with the system, the type of load(s) in electrical communication with the system, a desired split bus voltage, the type of inverter used in the system, etc. Alternatively, output setpoint 240 can be any other variable associated with the output of DC/DC converter 200. Based on the comparison, comparator 220 can provide an output to DC/DC controller 205. In an alternative embodiment, any other number of comparators may be used and/or any other number of variables, thresholds, etc. may be monitored and controlled. In another alternative embodiment, comparators may not be used, and the monitoring may be implemented using any other type of hardware/software known to those of skill in the art. For example, in one embodiment, summers may be used instead of comparators.

Direct current/direct current (DC/DC) controller 205 can provide a control signal to DC/DC converter 200 based on the inputs received from comparators 210, 215, and 220. As an example, comparator 210 may indicate that the output of fuel cell system 225 exceeds or is below reference value 230. In response, DC/DC controller 205 can provide a control signal to DC/DC converter 200 such that less or more power is drawn from fuel cell system 225. DC/DC controller 205 can similarly control DC/DC converter 200 based on inputs received from comparators 215 and 220 if an output of DC/DC converter 200 exceeds or is below output threshold 235 and/or output setpoint 240. In an exemplary embodiment, DC/DC controller 205 can be a proportional-integral (PI) controller as known to those of skill in the art. Alternatively, any other type(s) of controllers may be used. For example, DC/DC controller 205 may be a proportional-integral-derivative (PID) controller, a proportional-derivative (PD) controller, a proportional (P) controller, an integral (I) controller, etc. DC/DC controller 205 can be implemented in hardware and/or software, depending on the embodiment.

In an alternative embodiment, fuel cell system 225 may be replaced with an alternative DC power source. The alternative DC power source can be a solar cell system, a wind turbine system, a hydroelectric system, a battery, a generator, or any other type of DC source. The power provided from the alternative DC source can be monitored and controlled using DC/DC controller 205 and DC/DC converter 200 as described above with reference to fuel cell system 225. As such, DC power sources can be efficiently added to and incorporated within an existing fuel cell arrangement.

Figure 3:
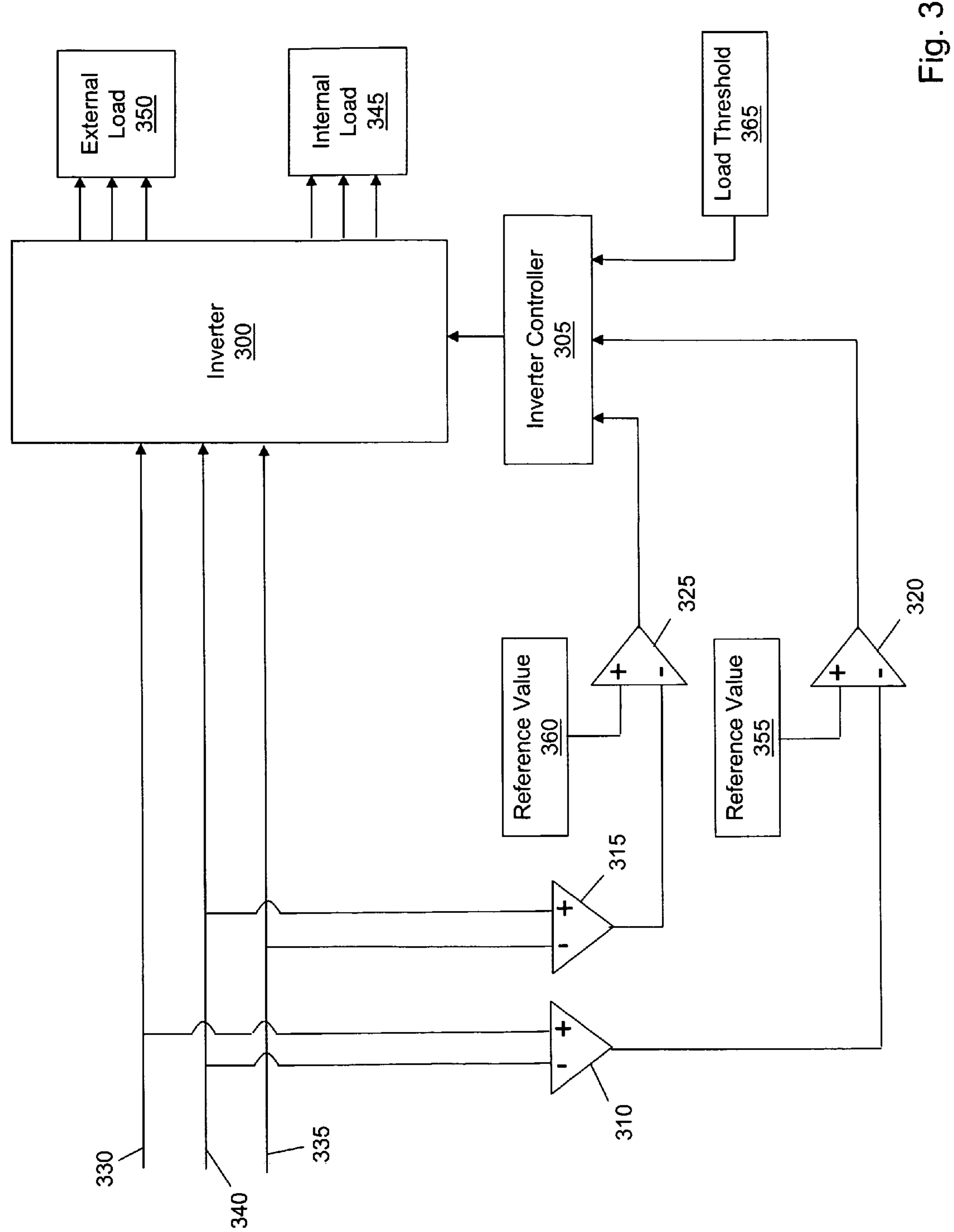
FIG. 3 is a block diagram illustrating an inverter system in accordance with an exemplary embodiment.

FIG. 3 is a block diagram illustrating an inverter system in accordance with an exemplary embodiment. The inverter system includes an inverter 300, an inverter controller 305, a comparator 310, a comparator 315, a comparator 320, and a comparator 325. In alternative embodiments, the inverter system may include fewer, additional, and/or different components. The inverter system can be used to control the amount of power drawn from a split bus having a positive bus 330, a negative bus 335, and a neutral bus 340. Split bus 330, 335, and 340 may be the same as split bus 150, 155, and 160 described with reference to FIG. 1. As such, the inverter system can maintain the split bus at a desired current, a desired voltage, etc. In alternative embodiments, a split bus configuration may not be used. The inverter system can also be used to distribute power to an internal load 345 and an external load 350. Internal load 345 and external load 350 may be the same as internal load 190 and external load 185 described with reference to FIG. 1. In alternative embodiments, power may be distributed to any number of loads in electrical communication with inverter 300.

Inverter controller 305 can receive inputs from comparators 320 and 325. Comparator 320 receives an input from comparator 310 which is in electrical communication with positive bus 330 and neutral bus 340. As such, comparator 310 can generate an output based on a voltage, current, power, etc. of positive bus 330. The output from comparator 310 is provided to comparator 320 for a comparison with a reference value 355. In an exemplary embodiment, reference value 355 can be a minimum desired voltage of positive bus 330. In one embodiment, reference value 355 may be +380 Volts. Alternatively, reference value 355 may be any other value. Based on the comparison, an output is provided from comparator 320 to inverter controller 305. Inverter controller 305 can control the amount of power drawn from the split bus based at least in part on the input from comparator 320. Similarly, comparator 325 receives an input from comparator 315, which is in electrical communication with negative bus 335 and neutral bus 340 of the split bus. As such, comparator 315 can generate an output based on a voltage, current, power, etc. of negative bus 335. The output from comparator 315 is provided to comparator 325 for a comparison with a reference value 360. In an exemplary embodiment, reference value 360 can be a minimum desired voltage of negative bus 335. In one embodiment, reference value 360 can be a voltage of −380 Volts. Alternatively, reference value 360 may be any other value. Based on the comparison, an output is provided from comparator 325 to inverter controller 305. Inverter controller 305 can control the amount of power drawn from the split bus based at least in part on the input from comparator 325. In another exemplary embodiment, reference values 355 and 360 can be less than output setpoint 240 described with reference to FIG. 2.

Comparators 310, 315, 320 and 325 can be implemented in hardware and/or software, and can be any type of comparators known to those of skill in the art. In an alternative embodiment, any other number of comparators may be used and/or any other number of variables, thresholds, etc. may be monitored and controlled. In another alternative embodiment, comparators may not be used, and the monitoring may be implemented using any other type of hardware/software known to those of skill in the art. For example, in one embodiment, summers may be used instead of comparators.

Inverter controller 305 can also receive a load threshold 365. Load threshold 365 can be a desired power to be delivered to internal load 345, a desired power to be delivered to external load 350, a maximum power to be delivered to internal load 345, a maximum power to be delivered to external load 350, etc. As an example, load threshold 365 can indicate that a maximum power of 25,000 Watts can be provided to external load 350. In such an example, inverter controller 305 can control inverter 300 such that the power provided to external load 350 does not exceed 25,000 Watts. In an alternative embodiment, inverter controller 305 may receive a plurality of load thresholds corresponding to one or more loads. In an exemplary embodiment, using the control signal from inverter controller 305, inverter 300 can track the maximum power that can be supplied to external load 350.

Based on the inputs from comparator 320, comparator 325, and load threshold 365, inverter controller 305 can provide a control signal to inverter 300 to control the amount of power drawn from the split bus and/or the amount of power distributed to internal load 345 and external load 350. As an example, comparator 320 may indicate that the voltage of positive bus 330 is less than reference value 355. In response, inverter controller 305 can reduce the amount of power drawn from the split bus such that a desired voltage of the split bus is maintained. Inverter controller 305 can also include an algorithm for distributing available power among a plurality of loads. As an example of a simple algorithm, inverter controller 305 may be configured to provide a first amount of power to internal load 345 and a second amount of power to external load 350, where the second amount of power is equal to the total received power less the first amount of power. Inverter controller 305 can also ensure that the second amount of power provided to external load does not exceed load threshold 365.

In one embodiment, inverter 300 can be implemented with no control wires. In such an embodiment, inverter 300 can calculate the amount of power to be drawn based at least in part on an output impedance of the source. Inverter 300 can determine the output impedance of the source by monitoring split bus 330, 335, and 340. Inverter 300 can also include an input voltage loop configured to correct the power supplied to the internal load 345 and external load 350 based at least in part on the control signal received from inverter controller 305. In another exemplary embodiment, inverter controller 305 can be a proportional-integral (PI) controller as known to those of skill in the art. Alternatively, any other type(s) of controllers may be used. For example, inverter controller 305 may be a proportional-integral-derivative (PID) controller, a proportional-derivative (PD) controller, a proportional (P) controller, an integral (I) controller, etc. Inverter controller 305 can be implemented in hardware and/or software, depending on the embodiment.

As described above, the control systems described herein can be implemented with hardware and/or software (or logic), depending on the embodiment. In one embodiment, the system can be implemented at least in part as instructions stored in a computer-readable medium. Upon execution of the instructions by a processor, the instructions can cause the processor to perform operations of a fuel cell load controller.

The foregoing description of exemplary embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method comprising:

receiving a first direct current (DC) signal at a first comparator from a positive bus of a split bus, wherein the split bus has a positive bus, a negative bus, and a neutral bus, and wherein the first DC signal is acquired from the positive DC bus relative to the neutral bus;

receiving a second direct current (DC) signal at a second comparator from a negative bus of the split bus, wherein the second DC signal is acquired from the negative DC bus relative to the neutral bus;

comparing the first DC signal to a first reference value to determine a first input signal;

comparing the second DC signal to a second reference value to determine a second input signal;

receiving at an inverter controller the first and second input signals;

applying by the inverter controller a control algorithm to determine, based at least in part on the first and second input signals, whether to adjust a magnitude of at least one of the first or second DC signals;

converting the first or second DC signals to an alternating current (AC) signal with the inverter; and providing the AC signal to a load.

2. The method of claim 1, wherein the inverter controller is selected from the group consisting of a proportional-integral-derivative controller, a proportional-derivative controller, a proportional controller, and an integral controller.

3. The method of claim 1, further comprising adjusting the magnitude of at least one of the first and second DC signals.

4. The method of claim 1, wherein the first and second reference values correspond to a threshold of the load or to a desired magnitude of the first and second DC signals.

5. The method of claim 1, wherein the first and second DC signals originate at a fuel cell system.

6. The method of claim 1, wherein providing the AC signal to the load comprises distributing the AC signal between an internal load and an external load.

7. A system comprising:

a split bus, wherein the split bus has a positive bus, a negative bus, and a neutral bus;

a first comparator in communication with the positive bus to receive a first DC signal;

a second comparator in communication the negative bus to receive a second DC signal;

an inverter controller configured to perform operations comprising:

receiving from the first comparator a first input signal, wherein the first input signal is determined by comparing the first DC signal to a first reference value;

receiving from the second comparator a second input signal, wherein the second input signal is determined by comparing the second DC signal to a second reference value; and applying by the inverter controller a control algorithm to generate, based at least in part on the first and second input signals, a control signal; and an inverter configured to perform operations comprising:

receiving the control signal from the inverter controller;

increasing or decreasing a magnitude of at least one of the first and second DC signals based at least in part on the control signal;

converting the first or second DC signals to an alternating current (AC) signal; and providing the AC signal to a load.

8. The system of claim 7, wherein the inverter controller is selected from the group consisting of a proportional-integral-derivative controller, a proportional-derivative controller, a proportional controller, and an integral controller.

9. The system of claim 8, further comprising a DC/DC converter configured to:

receive a DC signal from a fuel cell system;

increase or decrease a voltage of the DC signal based at least in part on a comparison of the DC signal to a second reference value; and provide the DC signal with increased or decreased voltage to the positive or negative bus of the split bus.

10. The system of claim 9, further comprising a DC/DC controller configured to adjust the magnitude of the DC signal based on an operating characteristic of the fuel cell system.

* * * * *